United States Patent
Eikenhorst et al.

(10) Patent No.: US 7,155,432 B2
(45) Date of Patent: Dec. 26, 2006

(54) METHOD AND SYSTEM DECODING USER DEFINED FUNCTIONS

(75) Inventors: Joel David Eikenhorst, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 10/757,787

(22) Filed: Jan. 15, 2004

(65) Prior Publication Data

US 2005/0160100 A1 Jul. 21, 2005

(51) Int. Cl.
*G06F 17/30* (2006.01)
*G06F 7/00* (2006.01)

(52) U.S. Cl. .................. 707/5; 707/5; 707/4; 707/3; 707/2

(58) Field of Classification Search .............. 707/2, 707/3, 4, 5
See application file for complete search history.

(56) References Cited

U.S. PATENT DOCUMENTS

| | | | | |
|---|---|---|---|---|
| 5,765,147 A * | 6/1998 | Mattos et al. | ................... | 707/4 |
| 5,987,455 A * | 11/1999 | Cochrane et al. | ............... | 707/4 |
| 6,285,996 B1 * | 9/2001 | Jou et al. | ....................... | 707/4 |
| 6,353,818 B1 * | 3/2002 | Carino, Jr. | ...................... | 707/2 |
| 6,938,044 B1 * | 8/2005 | Milby | ......................... | 707/100 |
| 2002/0129260 A1 * | 9/2002 | Benfield et al. | ............ | 713/189 |
| 2003/0004935 A1 * | 1/2003 | Wilmot et al. | .................. | 707/3 |
| 2003/0009446 A1 * | 1/2003 | Agarwal et al. | ............... | 707/2 |
| 2003/0037048 A1 * | 2/2003 | Kabra et al. | ................... | 707/4 |
| 2005/0154709 A1 * | 7/2005 | Barsness et al. | ............... | 707/3 |

OTHER PUBLICATIONS

Kollar et al., "SQL Server Query Optimization and Tuning", Sep. 9, 2003, Microsoft TechNet, pp. 7-9.*
Taylor et al., "A deductive database system with applications to route planning", 1991, Springer-Verlag (Wien, Australia).*
Jaedicke et al., "On Parallel Processing of Aggregate and Scalar Functions in Object-Relational DBMS", Proceedings of the 1998 ACM SIGMOD International Conference on Management of Data, pp. 379-389.*

* cited by examiner

*Primary Examiner*—Luke S Wassum
*Assistant Examiner*—Phuong-Thao Cao
(74) *Attorney, Agent, or Firm*—Wood, Herron & Evans, LLP

(57) ABSTRACT

A database engine and optimizer framework includes a decoder to identify and process SQL queries or statements that reference a UDF before they are executed. Once such a statement is detected, the decoder determines if the UDF is capable of being merged into an SQL statement and, if so, performs such a merge. In some embodiments, the decoder may not use a pre-cached version of the UDF but, instead, may include a component that locates and retrieves the latest version of the UDF for use when performing the merge. Also, for UDFs that cannot easily be merged into an SQL statement, the decoder may not merge the UDF into an SQL statement but may allow the optimizer and execution engine to retrieve and execute the UDF in the usual manner.

17 Claims, 3 Drawing Sheets

METHOD AND SYSTEM DECODING USER DEFINED FUNCTIONS

FIELD OF THE INVENTION

The invention relates to database management systems, and in particular, to executing user defined functions within an SQL statement.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

The variety and complexity of software applications that can be created using structured query language (SQL) rival that of many traditional programming languages and, accordingly, program development with SQL can be similar to traditional program development methods and techniques. In particular, a user can create or develop program structures called "user defined functions" (UDFs). Once such a structure is developed, it can be re-used in multiple SQL statements by simply referring to its name much like a function call in traditional programming languages.

The use of UDFs provide software developers the ability to generate functional code in ways that are familiar to them and to create code that is easier to read, understand, and maintain. An SQL query that includes references to UDFs will not be obscured by the multiple lines of actual code that form the UDF but, instead, will simply have a statement that references a single, appropriately-named UDF. Also, if programmatic changes are needed, multiple instances of code will not need to be modified. Rather, the one instance of a UDF can be revised and all references to that UDF will be able to take advantage of the revisions. One drawback, however, of using UDFs is that a UDF is less efficient during execution than native SQL statements. Accordingly, because of the overhead of retrieving and executing the code of a UDF, performance can suffer during runtime when the SQL query includes references to UDFs.

SUMMARY OF THE INVENTION

Embodiments of the present invention address these and other problems by utilizing a decoder to identify and process SQL queries or statements that reference a UDF before they are executed. Once such a statement is detected, the decoder determines if the UDF is capable of being merged into an SQL statement and, if so, performs such a merge. In some embodiments, the decoder may not use a pre-cached version of the UDF but, instead, may include a component that locates and retrieves the latest version of the UDF for use when performing the merge. Also, in embodiments, it may not be the case that all UDFs can easily be merged into an SQL statement. In these instances, the decoder would not merge the UDF into an SQL statement; it would allow the optimizer and execution engine to retrieve and execute the UDF in the usual manner.

One aspect of the present invention relates to a method for optimizing execution of structured query language statements. In accordance with this aspect, a UDF referenced in an SQL statement is analyzed to determine if the UDF can be merged into the SQL statement. If the UDF can be merged, a composite SQL statement is generated by merging the UDF into the original SQL statement.

DETAILED DESCRIPTION

As mentioned above, the embodiments discussed hereinafter utilize a database engine and optimizer framework that support merging UDF source code into an inline SQL statement. A specific implementation of such a database engine and optimizer framework capable of supporting this functionality in a manner consistent with the invention will be discussed in greater detail below. However, prior to a discussion of such a specific implementation, a brief discussion will be provided regarding an exemplary hardware and software environment within which such an optimizer framework may reside.

Figure 1:
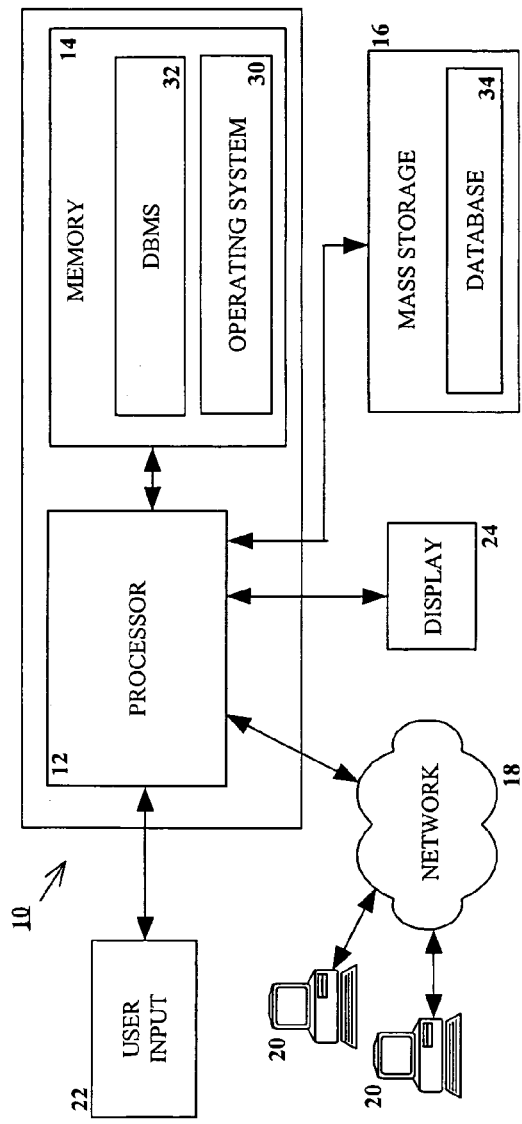
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system that generates inline merged SQL statements consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
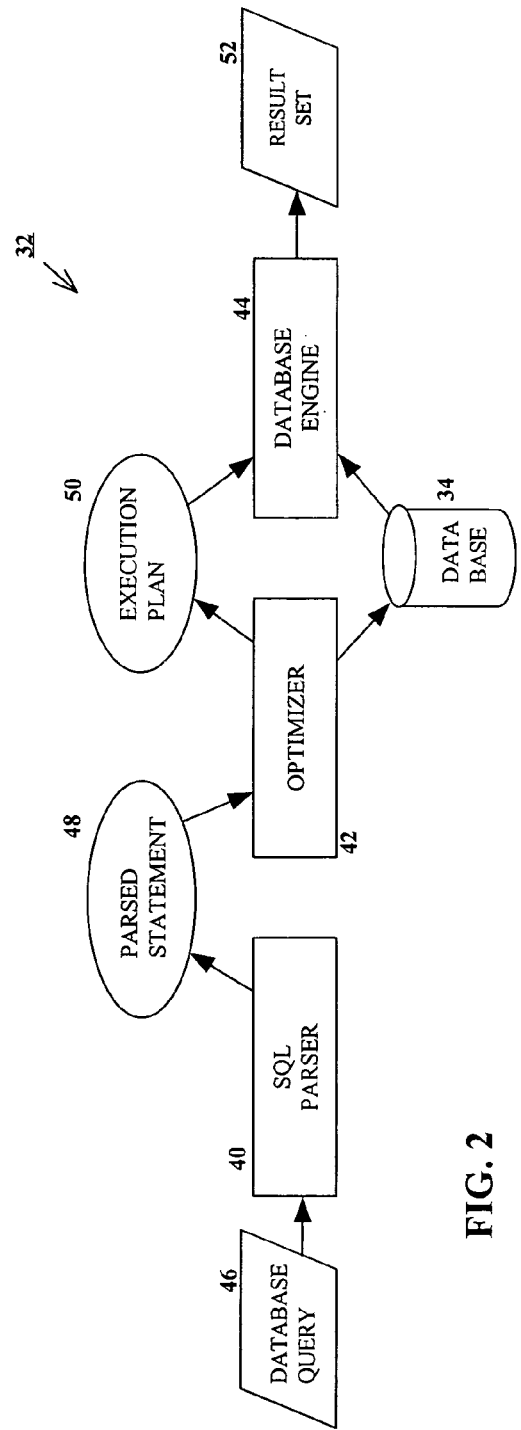
FIG. 2 is a block diagram illustrating the principal components and flow of information there between in the database management system of FIG. 1.

Turning briefly to FIG. 2, an exemplary implementation of database management system 32 is shown. The principal components of database management system 32 that are relevant to query optimization are an SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

In one embodiment of the present invention, the SQL parser 40 includes a runtime function decoder that detects when a UDF is embedded in an SQL statement and determines if the UDF can be merged with the SQL statement as part of generating the parsed statement 48 that is passed to the optimizer 42. The SQL parser 40 typically includes a number of runtime environment settings and may include optional settings related to the function decoder. For example, there may be a setting that allows the function decoder to be enabled/disabled. In this way, the SQL parser 40 can be run in a mode that prevents the function decoder from modifying any UDFs. Another possible setting is, for example, a threshold value that determines if a UDF is used often enough to warrant analyzing it for merging. While the above-described functionality and the detailed description below identify that merging of UDFs occurs within the SQL parser 40, other portions of the database system 32 may perform this functionality as well. Merging of UDFs into inline SQL statements can occur anywhere before execution of the statement referencing the UDF, such as, for example, within the optimizer 42 or as a preprocessor of the database engine 44.

If a UDF is referenced only a few times in a series, or set, of SQL statements, the resulting performance benefit may be insubstantial and not enough to justify merging each occurrence of that UDF. Therefore, the decoder can determine if a UDF is referred to more than a minimal number of times before merging the UDF into an SQL statement. One contemplated technique to accomplish this would be to analyze the set of statements before execution starts. Those UDFs that are referenced more than a predetermined number of times are identified as the candidates for merging into an SQL statement.

Figure 3:
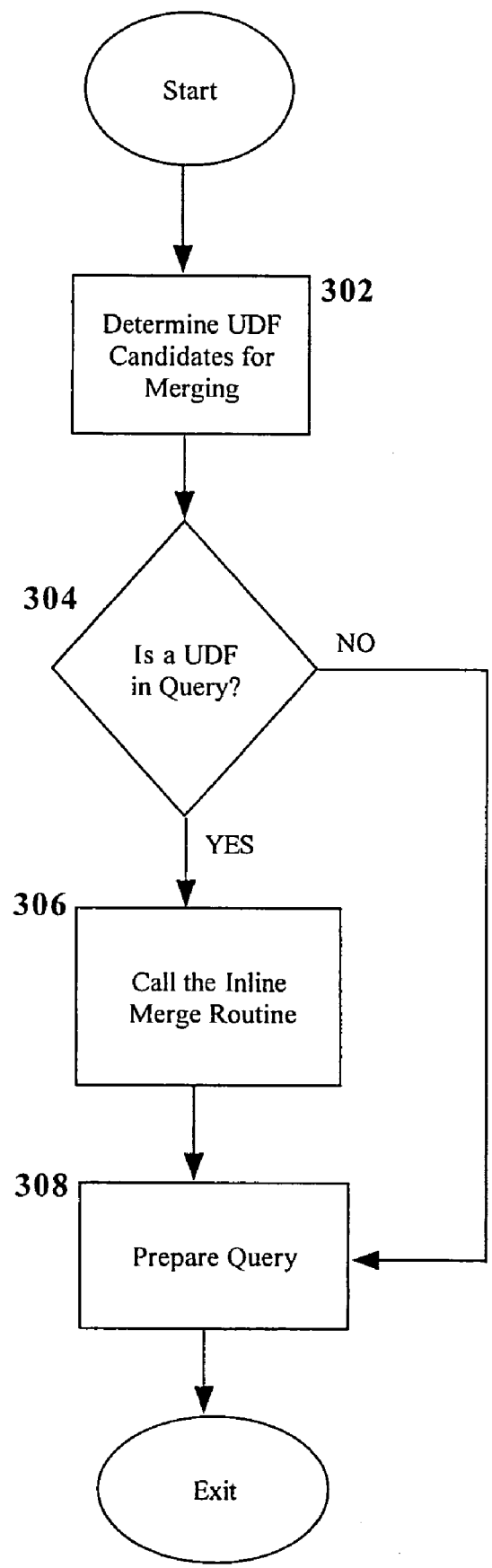
FIG. 3 illustrates a flowchart of an exemplary method for merging a UDF into an inline SQL statement in accordance with the principles of the present invention.

FIG. 3 provides a flowchart of an exemplary method for identifying UDFs referenced in an SQL statement and merging them into the SQL statement when appropriate. The flowchart begins, at step 302, by performing the optional step of determining which UDFs are potential candidates for merging. As mentioned above, the SQL parser may be configured to determine whether a UDF is referenced in a series of SQL statements more than a predetermined threshold before deciding whether to consider that UDF as a candidate for merging. In an interactive query environment, testing for the number of times a UDF is referenced may not be appropriate. Alternatively, when receiving a query as a batch of SQL statements from an application or some other source, the SQL parser 40 may perform step 302 to determine which UDFs are referenced enough times that merging them would potentially provide an improvement in the query's performance.

The decoder parses through each SQL statement to determine if a UDF reference is present, in step 304. If the optional step 302 has been performed, then the decoder may perform a compound test to determine whether a UDF is present and whether it is a UDF that has been identified as a potential candidate for merging. If no references to a UDF are found or if all UDFs referenced are not candidates for merging, then the SQL statement is executed in a conventional manner. If, however, a reference to a UDF is identified in step 304, then this SQL statement is passed, in step 306, to another routine that merges the UDF into the SQL statement if appropriate.

This merge routine of the decoder either returns the original SQL statement because the UDF could not be merged or returns a merged SQL statement that does not reference the UDF explicitly. Upon receiving one or the other, in step 308, the decoder utilizes the received SQL statement. For example, if the decoder is implemented as part of the SQL parser 42, then the received SQL statement is used when generating the parsed statement 48 for the optimizer 42.

Figure 4:
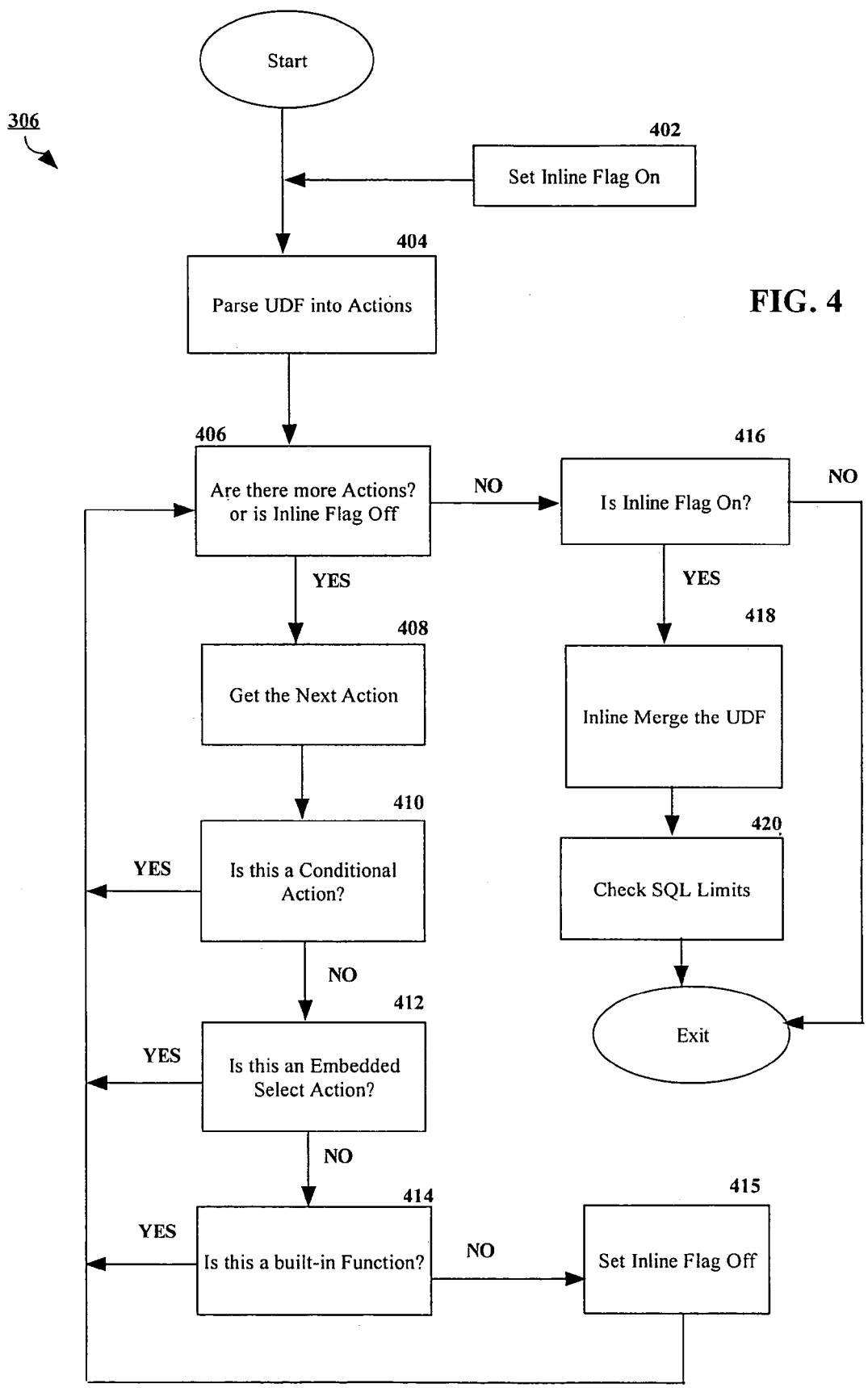
FIG. 4 illustrates a flowchart of an exemplary method for analyzing UDF source code in accordance with an embodiment of the present invention.

Because UDFs can be very complex and include a wide variety of programming logic, not all UDFs can be simply merged into an inline SQL statement. Therefore, before merging a UDF referenced in an SQL statement, the inline merge routine that is called in step 306 of FIG. 3 first analyzes the UDF to determine if it can be merged into an SQL statement. FIG. 4 illustrates a flowchart of an exemplary method for analyzing and merging a UDF into an SQL statement.

In step 402, a flag is first turned on that indicates that the UDF can be converted, or merged, into an inline SQL statement. This flag will either be turned off, or remain turned on, throughout the course of performing the steps of this flowchart. In step 404, the UDF is parsed into one or more actions.

An exemplary UDF may look like:

```
create function owner.utrimActions (
    in_string varchar(4000),
    mode varchar(4000)
)
returns varchar(4000)
  language sql
  begin
    if in_string is null then
      return null;
    else
      if in_string = '1' then
        in_string = 'Acquired';
      end if;
      if in_string = '2' then
        in_string = mode;
      end if;
      return upper(trim(in_string));
    end if;
  end;
```

Within this UDF, there are a number of actions such as two "if-then" actions, a "trim" action, and an "upper" action. A variety of parsing techniques are known to a skilled artisan in this field and the use of any of these techniques is contemplated to identify and parse the UDF into a number of distinct actions.

With the distinct actions within the UDF identified, analysis of these actions can begin. The method of FIG. 4 approaches the analysis of the actions by determining that there is a limited number of actions that can be merged into an SQL statement. If all the actions in a UDF can be merged, then the UDF can be merged. However, the identification and descriptions of certain actions herein is not intended to be an exhaustive list of all the possible actions that can successfully be merged but, instead, is an exemplary list of the types of actions that can be merged into an SQL statement.

In step 404, the code of the UDF is retrieved and parsed into its different actions. Because a UDF may reside in a cache or other temporary memory, step 404 is performed in such a manner as to ensure that the latest version of the UDF is retrieved and parsed. Each action that is identified in step 404 is analyzed to see if it can be merged into an SQL statement. After step 404, a determination is made in step 406 as to whether there are more actions to analyze. The first time through the flowchart, then, step 406 is satisfied and the first action is retrieved in step 408, from the list of actions generated in step 404. The action is tested in step 410 to determine if it is a conditional action. Examples of conditional actions are "if-then" statements and "case" statements. If this test is satisfied, then control returns to step 406 to repeat the analysis with any remaining actions.

If, however, the action is not a conditional action, then step 412 tests whether it is an embedded SELECT action. This type of action involves a query in which the result of a subquery is part of the selection criteria of a main SELECT query. If this test is satisfied, then control returns to step 406 to analyze remaining actions.

If the action fails the test of step 412, then step 414 tests whether the action is a built-in function. SQL includes a number of built-in functions that operate on characters, numbers, dates and perform other conversions. Examples of commonly used functions include "CHAR", "TRIM", "UPPER", "LOWER", "ABS". These functions operate on data to perform such things as to take an absolute value of a number, remove leading and trailing blank spaces, or change all characters to upper case.

If the action fails the test of step 414, then the inline flag is turned off, in step 415, and control returns to step 406. At step 406, a determination is made whether more actions are to be analyzed. If the inline flag is off, then the UDF is not a candidate to be merged into an SQL statement; therefore, even if other actions have yet to be analyzed, control can pass to step 416. When in step 406 it is determined that all the actions of the UDF have been analyzed, then control passes to step 416 as well.

At step 416, the inline flag is tested to determine if the UDF can be merged. If the flag is off, then the routine exits without merging the UDF into an SQL statement. If the inline flag is still on, however, control continues with step 418. In step 418, the UDF is rewritten, or merged into an inline SQL statement. By way of example, the UDF code described above can be called in an SQL statement such as:

Select utrimActions(in_acq_actions, mode) from
     acquisitions where acq_id=?

or, such as

Select utrimActions(in_acq_actions, mode) from
     acquistions where acq_number=?

Both of these statements reference the UDF called "utrimActions" and when encountered by the decoder would be passed into the method of FIG. 4. When this UDF is passed into the method of FIG. 4, the source code is broken into actions that happen to satisfy all the tests of steps 410–414. Thus, the inline flag remains on and the code is merged in step 418 into an SQL statement. The first statement above would result in the merged SQL statement of:

Select case in_acq_actions when    '1' then 'ACQUIRED',
                                  '2' then UPPER(TRIM(mode))
  end
from acquisitions where acq_id = ?

While the second SQL statement would result in an inline SQL statement of:

Select case in_acq_actions when    '1' then 'ACQUIRED',
                                  '2' then UPPER(TRIM(mode))
  end
from acquisitions where acq_number = ?

These merged SQL statements perform equivalently to the earlier statements that referenced the UDF. However, execution of these merged statements can be accomplished without retrieving and executing the code of the UDF thereby providing a performance benefit.

Once the inline merged SQL statement is generated, another test is performed in step 420. In this test, the inline statement is tested to determine if it violates any system limitations placed on SQL statements. For example, some SQL implementation limit an SQL statement to being less than 4000 characters. If the merged SQL statement satisfies all the limitations of step 420, then the merged statement is passed out of this routine to be executed. If, however, the merged SQL statement is invalid, then the original SQL statement is passed out of this routine instead of the merged SQL statement.

Various modifications may be made to the illustrated embodiments without departing from the spirit and scope of the invention. Therefore, the invention lies in the claims hereinafter appended.

What is claimed is:

1. A method for optimizing execution of structured query language statements, comprising the steps of:
  (a) determining if a user-defined function referenced by an original structured query language statement can be merged into the original structured query language statement; and
  (b) if the user-defined function can be merged, then generating a composite structured query language statement by merging the user-defined function into the original structured query language statement.

2. The method of claim 1, further comprising the step of:
  (c) identifying the user-defined function referenced by the original structured query language statement.

3. The method of claim 1, further comprising the step of:
  (c) executing the composite structured query language statement instead of the original structured query language statement.

4. The method of claim 1, further comprising the steps of:
  (c) repeating steps (a) and (b) for a set of structured query language statements;
  (d) determining a number of references to the user-defined function within the set; and
  (e) performing step (b) if the number of references to the user-defined function exceeds a predetermined threshold.

5. The method of claim 1, further comprising the steps of:
  (c) identifying a current version of the user-defined function referenced in the original structured query language statement; and (d) using the current version when performing the conditional step of generating the composite structured language statement.

6. The method of claim 1, further comprising the steps of:
   (c) executing the original structured query language statement if the user-defined function cannot be merged; and
   (d) calling the user-defined function referenced in the original structured query language statement.

7. The method of claim 1, wherein the step of determining further includes the step of:
   checking whether the composite structured query language statement exceeds a system limitation.

8. The method of claim 7, wherein the system limitation is that of a maximum size for a valid structured query language statement.

9. The method of claim 1, further comprising the steps of:
   (c) receiving input related to disabling the generating of the composite structured query language statement; and
   (d) based on the received input, not generating the composite structured query language statement even if the user-defined function can be merged into the original structured query language statement.

10. The method of claim 1, wherein the step of generating further includes the steps of:
    parsing the user-defined function into one or more actions;
    testing each of the one or more actions to determine if that action can be merged; and
    based on the testing, rewriting the user-defined function into the composite structured query language statement.

11. The method of claim 10, wherein the step of testing further includes the step of:
    determining if each action is one of a conditional action, an embedded query, and a built-in function.

12. An apparatus, comprising:
    at least one processor;
    a memory coupled with the at least one processor; and
    a program code residing in the memory and executed by the at least one processor, the program code configured to:
    determine if a user-defined function referenced by an original structured query language statement can be merged into the original structured query language statement; and
    if the user-defined function can be merged, then generate a composite structured query language statement by merging the user-defined function into the original structured query language statement.

13. The apparatus of claim 12, wherein the program code is further configured to:
    identify the user-defined function referenced by the original structured query language statement.

14. The apparatus of claim 12, wherein the program code is further configured to:
    execute the composite structured query language statement instead of the original structured query language statement.

15. The apparatus of claim 12, wherein the program code is further configured to:
    identify a current version of the user-defined function referenced in the original structured query language statement; and
    use the current version when performing the conditional step of generating the composite structured language statement.

16. The apparatus of claim 12, wherein the program code is further configured to:
    execute the original structured query language statement if the user-defined function cannot be merged; and
    call the user-defined function referenced in the original structured query language statement.

17. A program product, comprising:
    program code configured upon execution thereof to:
    determine if a user-defined function referenced by an original structured query language statement can be merged into the original structured query language statement; and
    if the user-defined function can be merged, then generate a composite structured query language statement by merging the user-defined function into the original structured query language statement; and
    a recordable type medium bearing the program code.

* * * * *